US009628638B2

(12) United States Patent
Yamanaka et al.

(10) Patent No.: US 9,628,638 B2
(45) Date of Patent: Apr. 18, 2017

(54) IMAGE PROCESSING APPARATUS, METHOD FOR CONTROLLING THE SAME, AND PROGRAM

(71) Applicant: Konica Minolta, Inc., Chiyoda-ku, Tokyo (JP)

(72) Inventors: Tomoo Yamanaka, Toyokawa (JP); Hisataka Funakawa, Okazaki (JP); Akira Ohhata, Toyokawa (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 15/009,138

(22) Filed: Jan. 28, 2016

(65) Prior Publication Data

US 2016/0224289 A1    Aug. 4, 2016

(30) Foreign Application Priority Data

Jan. 29, 2015  (JP) ................................ 2015-015606

(51) Int. Cl.
*G06F 3/12*  (2006.01)
*H04N 1/00*  (2006.01)

(52) U.S. Cl.
CPC ..... *H04N 1/00127* (2013.01); *H04N 1/00129* (2013.01); *H04N 1/00204* (2013.01); *H04N 1/00408* (2013.01); *H04N 1/00411* (2013.01)

(58) Field of Classification Search
None
See application file for complete search history.

(56) References Cited

U.S. PATENT DOCUMENTS

| 8,285,210 | B2* | 10/2012 | Oshima | H04W 4/02 358/1.15 |
| 8,922,819 | B2* | 12/2014 | Itogawa | G06F 3/1292 358/1.15 |
| 8,964,232 | B2* | 2/2015 | Itogawa | G06F 3/1236 358/1.1 |
| 2005/0185216 | A1* | 8/2005 | Mitsuhashi | H04N 1/00496 358/1.15 |
| 2010/0069008 | A1* | 3/2010 | Oshima | H04W 4/02 455/41.3 |

(Continued)

FOREIGN PATENT DOCUMENTS

JP    2008-310713 A    12/2008

*Primary Examiner* — Dung Tran
(74) *Attorney, Agent, or Firm* — Buchanan Ingersoll & Rooney PC

(57) ABSTRACT

An image processing apparatus capable of communicating with a terminal includes: a first communication unit configured to communicate wirelessly with the terminal; and a second communication unit configured to perform near field communication with the terminal over a shorter communication distance than that of the first communication unit, wherein the second communication unit is configured to be movable together with an operation panel of the image processing apparatus and establish communication with the terminal in a specific area on the operation panel, and the first communication unit is placed with respect to the operation panel such that the specific area includes a communication establishment distance within which the first communication unit establishes communication with the terminal irrespective of the movement of the operation panel.

14 Claims, 12 Drawing Sheets

(56) References Cited

U.S. PATENT DOCUMENTS

| | | | |
|---|---|---|---|
| 2011/0075213 A1* | 3/2011 | Murayama | G03G 21/1882 358/1.15 |
| 2013/0155450 A1* | 6/2013 | Higashikawa | B41J 2/1752 358/1.15 |
| 2014/0029050 A1* | 1/2014 | Chen | G06K 15/40 358/1.15 |
| 2014/0104635 A1* | 4/2014 | Nishikawa | H04N 1/00238 358/1.14 |
| 2014/0168681 A1* | 6/2014 | Nakamura | G06F 3/1276 358/1.13 |
| 2014/0240763 A1* | 8/2014 | Urakawa | G06F 3/1292 358/1.15 |
| 2014/0320900 A1* | 10/2014 | Moriya | G06F 3/1206 358/1.15 |
| 2014/0320908 A1* | 10/2014 | Iwauchi | H04L 45/22 358/1.15 |
| 2014/0320909 A1* | 10/2014 | Shimazaki | H04W 8/005 358/1.15 |
| 2014/0320910 A1* | 10/2014 | Shimazaki | G06F 3/1292 358/1.15 |
| 2014/0340698 A1* | 11/2014 | Baba | H04B 5/0056 358/1.13 |
| 2014/0340701 A1* | 11/2014 | Okamura | G06F 3/121 358/1.14 |
| 2015/0002879 A1* | 1/2015 | Naruse | G06F 3/1222 358/1.14 |
| 2015/0036185 A1* | 2/2015 | Asai | H04N 1/00973 358/1.15 |
| 2015/0317117 A1* | 11/2015 | Yun | H04W 64/00 358/1.15 |

\* cited by examiner

CASE OF $a \cdot \cos\theta > x$

CASE OF a·cosθ ≤ x

CASE OF a·cosθ > x ··· (A1)

$$r = \sqrt{x^2 + (y + a \cdot \sin\theta)^2} \quad \cdots (1)$$

$$d = a \cdot \cos\theta > -x \quad \cdots (2)$$

CASE OF a·cosθ ≤ x ··· (A2)

$$r = \sqrt{x^2 + (y + a \cdot \sin\theta)^2} \quad \cdots (1)$$

$$d = x - a \cdot \cos\theta \quad \cdots (3)$$

*FIG. 13*
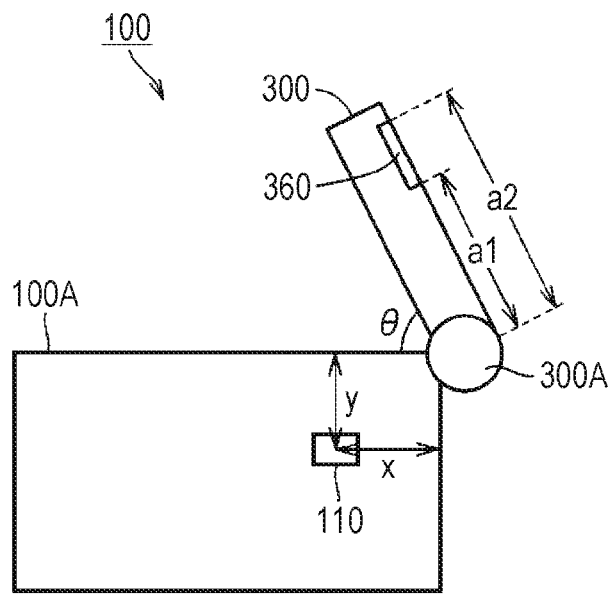
*FIG. 14*
$1/2(a1+a2)\cdot\cos\theta > x \cdots (B1)$
$1/2(a1+a2)\cdot\cos\theta \le x \cdots (B2)$
*FIG. 15*
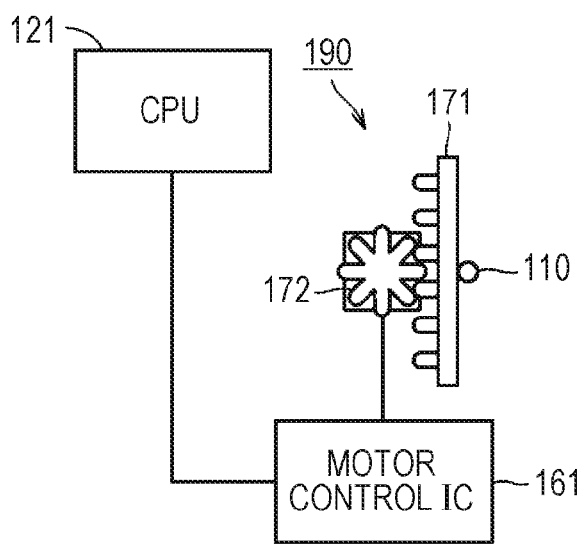

IMAGE PROCESSING APPARATUS, METHOD FOR CONTROLLING THE SAME, AND PROGRAM

The entire disclosure of Japanese Patent Application No. 2015-015606 filed on Jan. 29, 2015 including description, claims, drawings, and abstract are incorporated herein by reference in its entirety.

BACKGROUND OF THE INVENTION

Field of the Invention

The present disclosure relates to an image processing apparatus, a method for controlling the same, and a program, and particularly relates to an image processing apparatus capable of wireless communication through a plurality of communication technologies, a method for controlling the same, and a program to be executed in such an image processing apparatus.

Description of the Related Art

In recent years, some image processing apparatuses such as MFPs (Multi-Functional Peripherals) communicate wirelessly with terminals such as smartphones. Various technologies for apparatuses that communicate wirelessly with terminals are disclosed. For example, JP 2008-310713 A discloses an electronic money charging apparatus. The electronic money charging apparatus includes an antenna for a contactless IC (Integrated Circuit) card reader/writer below and in front of a slot of a card reader related to the card reader/writer.

There is a plurality of communication technologies used by the terminals.

For example, a communication device adopting a NFC (Near Field Communication) technology whose communication distance is equal to or less than several cm is mounted in a terminal adopting Android (registered trademark) as an operating system in many cases. On the other hand, a communication device adopting Bluetooth (registered trademark) whose communication distance is approximately several m is mounted in a terminal adopting iOS (registered trademark) as an operating system in many cases.

There is such a difference in communication distance. Accordingly, in order to cause the former terminal to communicate with an image processing apparatus, a user brings the terminal close to (or into contact with) a detection unit of the image processing apparatus to communicate. However, in order to cause the latter terminal to communicate with the image processing apparatus, the user communicates without bringing the terminal close to the image processing apparatus. There is a problem that such a difference in communication distance based on the difference in communication technology between terminals may confuse users about operability.

SUMMARY OF THE INVENTION

The present disclosure has been contrived considering such circumstances, and an object thereof is to, even if a communication unit of one communication technology moves on the image processing apparatus, set a position where a terminal being a communication partner establishes communication at the time of communication at the same position in an image processing apparatus irrespective of the communication technology of the terminal.

To achieve the above mentioned object, according to an aspect, an image processing apparatus capable of communicating with a terminal, reflecting one aspect of the present invention comprises: a first communication unit configured to communicate wirelessly with the terminal; and a second communication unit configured to perform near field communication with the terminal over a shorter communication distance than that of the first communication unit, wherein the second communication unit is configured to be movable together with an operation panel of the image processing apparatus and establish communication with the terminal in a specific area on the operation panel, and the first communication unit is placed with respect to the operation panel such that the specific area includes a communication establishment distance within which the first communication unit establishes communication with the terminal irrespective of the movement of the operation panel.

To achieve the abovementioned object, according to an aspect, an image processing apparatus capable of communicating with a terminal, reflecting one aspect of the present invention comprises: a first communication unit configured to communicate wirelessly with the terminal; a second communication unit configured to perform near field communication with the terminal over a shorter communication distance than that of the first communication unit, be movable together with an operation panel of the image processing apparatus, and establish communication with the terminal in a specific area on the operation panel; and a moving unit configured to move the first communication unit in accordance with the movement of the operation panel such that the specific area includes a communication establishment distance within which the first communication unit establishes communication with the terminal.

To achieve the abovementioned object, according to an aspect, there is provided a method for controlling an image processing apparatus reflecting one aspect of the present invention, the image processing apparatus having a first communication unit that communicates wirelessly with a terminal, and a second communication unit that performs near field communication with the terminal over a shorter communication distance than that of the first communication unit. The second communication unit is configured to be movable together with an operation panel of the image processing apparatus and establish communication with the terminal in a specific area on the operation panel. The method includes moving the first communication unit with the movement of the operation panel such that the specific area includes a communication establishment distance within which the first communication unit establishes communication with the terminal.

To achieve the abovementioned object, according to an aspect, there is provided a non-transitory recording medium storing a computer readable program reflecting one aspect of the present invention, the program to be executed in an image processing apparatus having a first communication unit that communicates wirelessly with a terminal, and a second communication unit that performs near field communication with the terminal over a shorter communication distance than that of the first communication unit. The second communication unit is configured to be movable together with an operation panel of the image processing apparatus, and establish communication with the terminal in a specific area on the operation panel. The program causes the image processing apparatus to execute moving the first communication unit in accordance with the movement of the operation panel such that the specific area includes a communication establishment distance within which the first communication unit establishes communication with the terminal.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein:

FIG. 13 is a diagram illustrating the distances between a lower end of the operation panel and upper and lower ends of the touch area;

FIG. 14 is a diagram illustrating conditions including the distances between the lower end of the operation panel and the upper and lower ends of the touch area;

FIG. 15 is a diagram schematically illustrating the configuration of a moving unit for moving a wireless communication unit in an MFP of a second embodiment;

DESCRIPTION OF THE PREFERRED EMBODIMENTS

Figure 1:
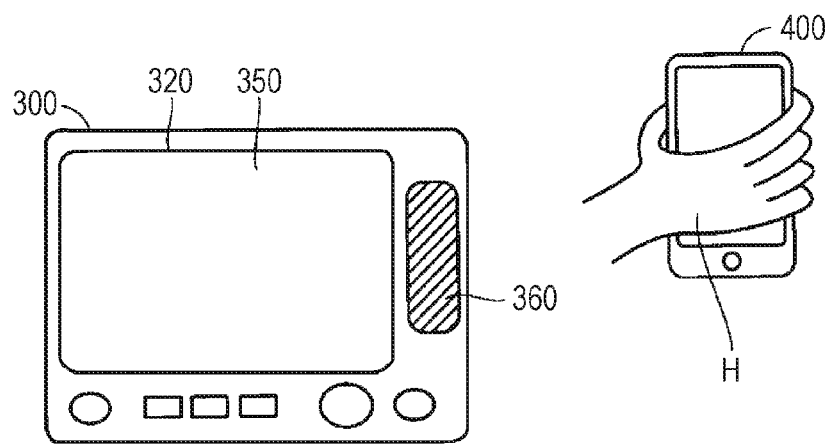
FIG. 1 is a diagram for explaining a positional relationship at the time of communication between an MFP of a first embodiment and a terminal.

Hereinafter, an embodiment of an image processing apparatus according to the present disclosure will, be described with reference to the drawings. However, the scope of the invention is not limited to the illustrated examples. In the following description, the same reference numerals are assigned to the same parts or components. Their names and functions are also the same. Therefore, their descriptions are not repeated.

First Embodiment

1. Outline of the Configuration of a MFP

FIGS. 1 to 4C are diagrams for explaining an outline of the configuration of a MFP being a first embodiment of an image processing apparatus according to the present disclosure. Firstly, a positional relationship at the time of communication between the MFP and a terminal is described with reference to FIGS. 1 and 2.

(Positional Relationship at the Time of Communication Between the MFP and the Terminal)

Figure 2:
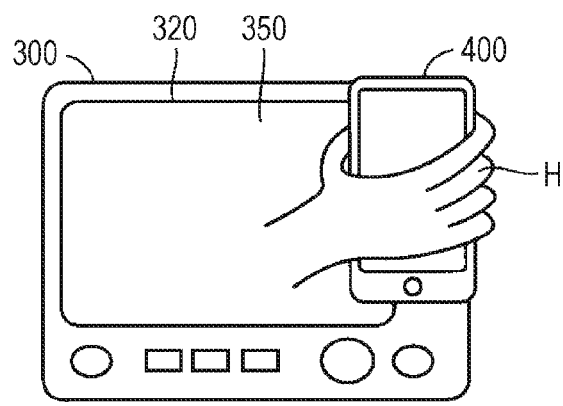
FIG. 2 is a diagram for explaining a positional relationship at the time of communication between the MFP of the first embodiment and the terminal.

FIGS. 1 and 2 illustrate an operation panel 300 being a part of the MFP (a MFP 100 described later) being the first embodiment, and a mobile terminal 400 that communicates wirelessly with the MFP. A hand H represents a user's hand holding the mobile terminal 400. The operation panel 300 includes a display 320, and a touch sensor 350 provided on the display 320.

The MFP can communicate with the mobile terminal 400 through at least two kinds of communication technologies. The first kind is a communication technology such as Bluetooth. The second kind is a communication technology such as NFC that has a shorter communication distance than the first kind of communication technology. In the specification, in order to distinguish these two kinds of communication technologies from each other, communication in the former communication technology is referred to as "wireless communication" and communication in the latter communication technology as "near field communication."

"Wireless communication" can be established by a user locating the mobile terminal 400 within an area of approximately several in from the MFP 100. On the other hand, as illustrated in FIG. 2, the user needs to bring the mobile terminal 400 close to the operation panel 300 to establish "near field communication."

An area indicating a preferred position of a terminal that communicates with the MFP in near field communication is set as a touch area 360 on the operation panel 300. The touch area 360 is presented as, for example, a frame printed on a housing of the operation panel 300. The touch area 360 is placed near the touch sensor 350 as illustrated in FIG. 1. Consequently, the user can cause the terminal to communicate with the MFP while looking at the display 320. The touch area 360 is an example of an instruction unit indicating a specific position being a position of the terminal communicating with a near field communication unit.

(Placement of a Communication Device in Wireless Communication)

In the MFP of the first embodiment, the placement of a communication device in wireless communication is set in accordance with the placement of a communication device in near field communication. FIGS. 3 and 4A to 4C are diagrams for explaining the placement of the communication device in wireless communication in the MFP of the first embodiment.

Figure 3:
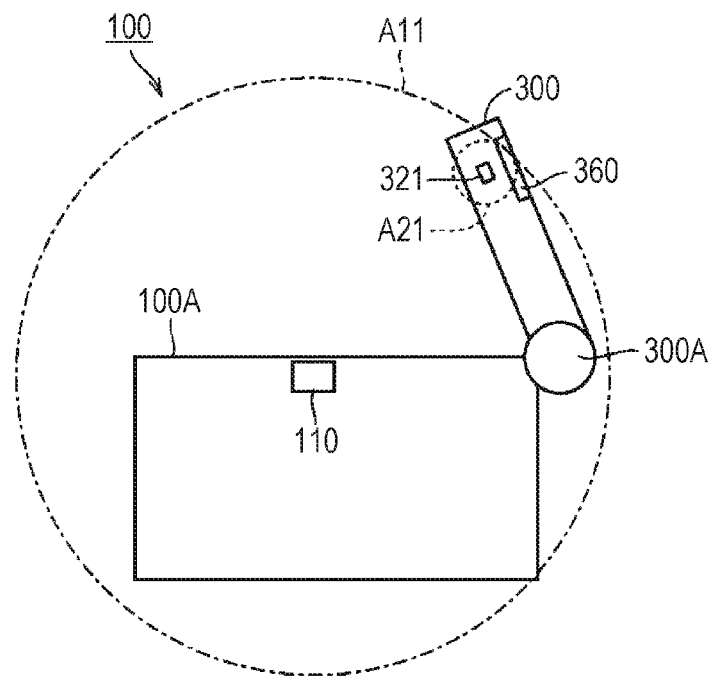
FIG. 3 is a diagram for explaining an outline of the configuration of the MFP of the first embodiment.

Firstly, FIG. 3 is referred to. The operation panel 300 is attached to a main body 100A of the MFP 100. The operation panel 300 can rotate about a hinge 300A.

The MFP 100 includes the communication device for wireless communication as a wireless communication unit 110 in the main body 100A. On the other hand, the communication device for near field communication is included in the operation panel 300. In FIG. 3, an antenna unit of the communication device for near field communication is illustrated as a near field communication unit 321 in the operation panel 300.

In FIG. 3, a broken line A21 indicates a communication distance of the communication device for near field communication. The broken line A21 is a circle with the near field communication unit 321 at the center. The MFP 100 can communicate with the mobile terminal 400 in near field communication when (a communication device for near field communication of) the mobile terminal 400 is located within an area indicated by the broken line A21.

In FIG. 3, a broken line A11 indicates an area where the wireless communication unit 110 establishes wireless communication. The MFP 100 achieves control to establish wireless communication with the mobile terminal 400 when (a communication device for wireless communication of) the mobile terminal 400 is located within the area indicated by the broken line A11. The broken line A11 has an intersection with the broken line A21 on the touch area 360. This corresponds to that an outer edge of the area where a connection of communication by the wireless communication unit is established includes an instruction unit that indicates a specific position being the position of the terminal that communicates with the near field communication unit.

An area where the wireless communication unit 110 can communicate is wider than the area indicated by the broken line A11. In other words, in the first embodiment, control is achieved which limits the area were wireless communication is established to a narrower area than the area the wireless communication unit 110 can communicate such that the outer edge of the broken line A11 has an intersection with the broken line A21 on the touch area 360. With such control, the user is simply required to hold the mobile terminal 400 over the same place (the touch area 360) when establishing both wireless communication and near field communication between the MFP 100 and the mobile terminal 400. Consequently, the user is not required the inconvenience of changing the placement of the mobile terminal 400 depending on the communication technology.

In the MFP 100 of the first embodiment, the area where wireless communication is established is controlled in the above manner. Accordingly, the wireless communication unit 110 can be accommodated in the main body 100A while the broken line A11 is caused to have an intersection with the broken line A21 on the touch area 360.

Figure 4A:
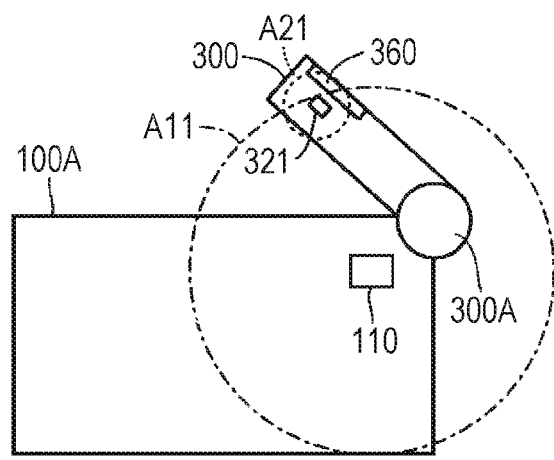
FIGS. 4A to 4C are diagrams for explaining an outline of the configuration of the MFP of the first embodiment.
Figure 4B:
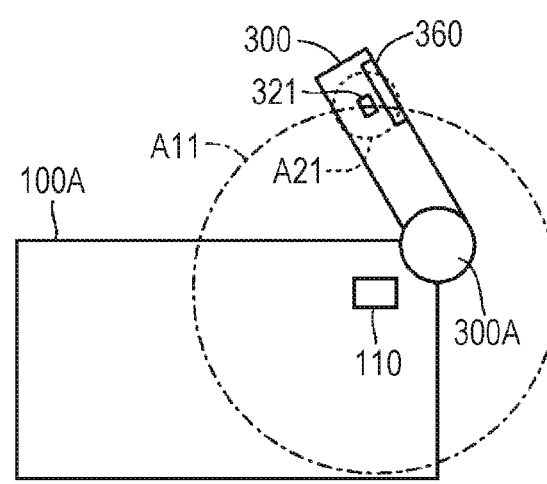
Figure 4C:
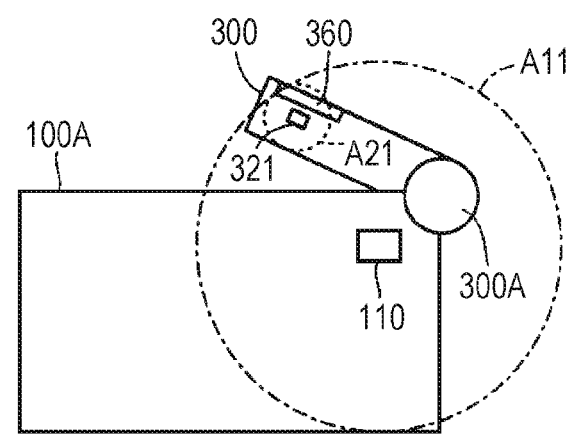

Next, a description is given of that the placement of the wireless communication unit 110 is set based on three possible positions that the near field communication unit 321 takes in the MFP 100, with reference to FIGS. 4A to 4C.

FIGS. 4A to 4C illustrate three states A to C. In the MFP 100 of the first embodiment, the operation panel 300 can take three attitudes as illustrated in the states A to C. In the MFP 100, the wireless communication unit 110 is placed such that the outer edge (the broken line A11) of the area where wireless communication is established has an intersection with the outer edge (the broken line A21) of the area where near field communication is established, in the touch area 360 in all the states A to C. Consequently, in the MFP 100, the mobile terminal 400 is held over the same place (the touch area 360) to enable the establishment of both wireless communication and near field communication at any position that can be taken by the operation panel 300.

2. External Appearance

Figure 5:
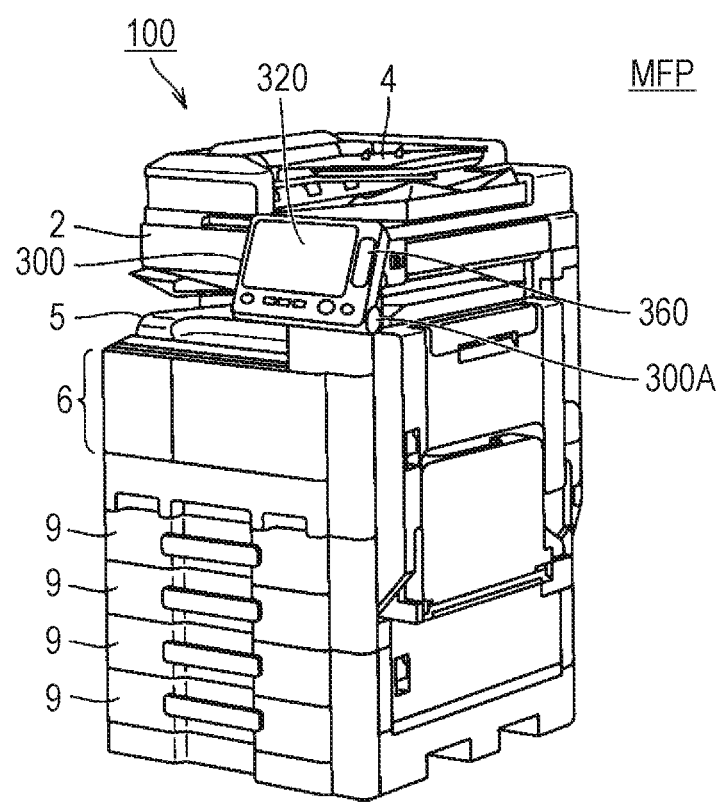
FIG. 5 is a diagram illustrating an external appearance of the MFP of the first embodiment.

FIG. 5 is a diagram illustrating an external appearance of the MFP 100.

As illustrated in FIG. 5, the MFP 100 includes a scanner unit 2 that optically reads a document and obtains image data, and a printing unit 6 that prints an image on a sheet of paper based on the image data. A feeder 4 that sends a document to the scanner unit 2 is placed on an upper surface of the main body of the image forming apparatus MFP 100. Moreover, a plurality of paper feeding units 9 that feed sheets to the printing unit 6 is placed in a lower part of the MFP 100. Moreover, a tray 5 where a sheet on which an image has been formed by the printing unit 6 is ejected is placed in a center part of the MFP 100.

In the MFP 100, the operation panel 300 is mounted on a front surface side of an upper part of the main body of the MFP 100. "Front surface" is a surface of the MFP 100, which faces a user who uses the MFP 100. The outer shape of the operation panel 300 is a substantially plate shape. In the MFP 100, the operation panel 300 is installed such that its principal surface is inclined in the vertical direction. Moreover, the operation panel 300 may be provided with a mechanism for changing the angle of the operation panel 300 in accordance with the state of the user (such as the user s height or the user is in a wheelchair).

3. Hardware Configuration of the MFP 100

Figure 6:
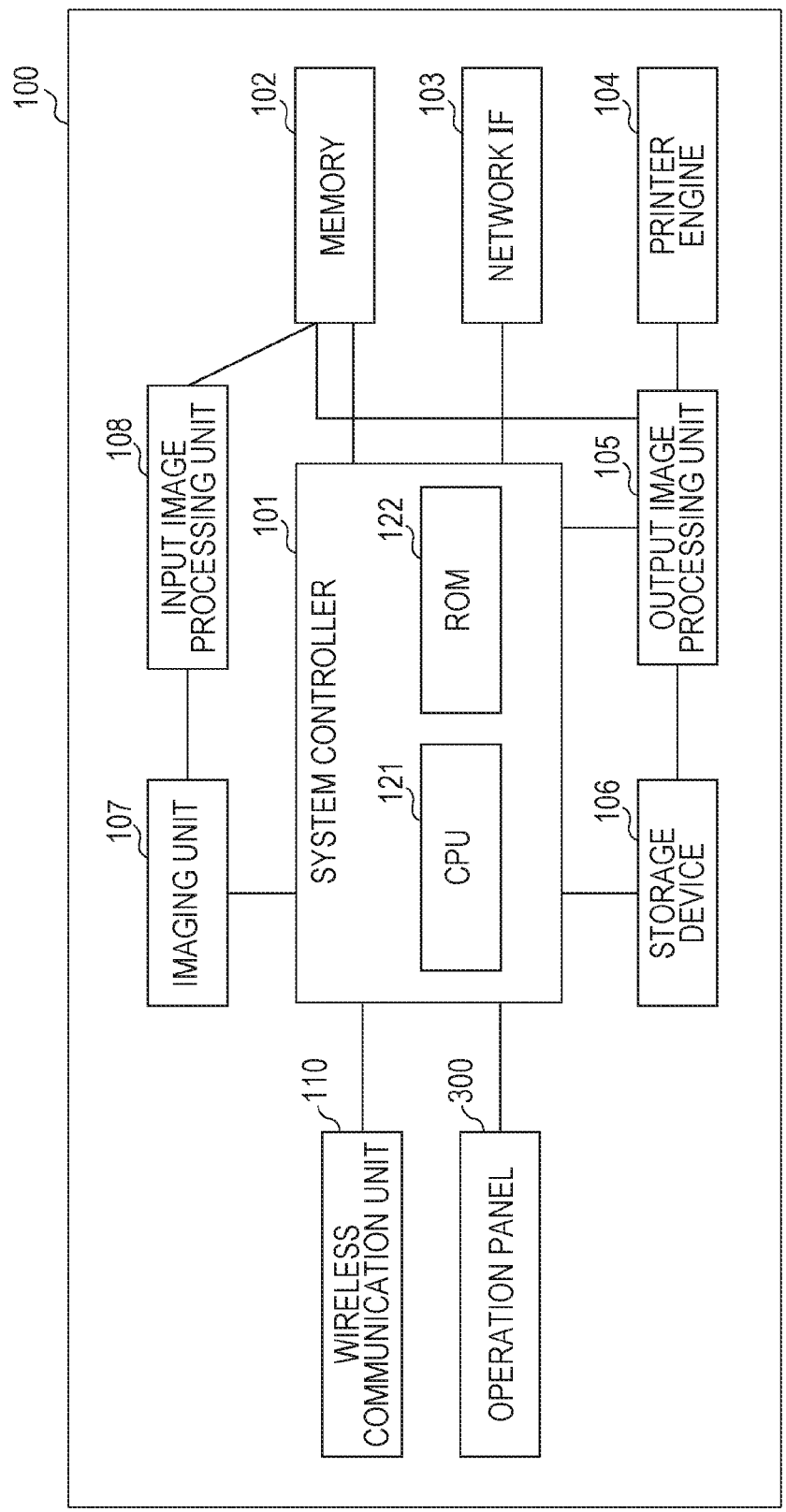
FIG. 6 is a block diagram illustrating the hardware configuration of the MFP of the first embodiment.

(Configuration of the Main Body of the MFP)
FIG. 6 is a block diagram illustrating the hardware configuration of the MFP 100.

FIG. 6 is referred to. The MFP 100 includes a system controller 101, a memory 102, a network interface (I/F) 103, a printer engine 104, an output image processing unit 105, a storage device 106, an imaging unit 107, an input image processing unit 108, and the operation panel 300. The system controller 101 is connected to the memory 102, the network interface 103, the printer engine 104, the output image processing unit 105, the storage device 106, the imaging unit 107, the input image processing unit 108, and the operation panel 300, for example, via an internal bus.

The system controller 101 controls the entire MFP 100 about various jobs such as a scan job, a copy job, a mail sending job, and a print job. The system controller 101 includes a CPU (Central Processing Unit) 121 and a ROM (Read Only Memory) 122.

The CPU 121 executes a control program stored in the ROM 122. The ROM 122 stores various programs of control over the operation of the MFP 100, and various types of fixed data. The CPU 121 performs predetermined processes to read data from the memory 102 and writes data into the memory 102.

The memory 102 is, for example, RAM (Random Access Memory), and is used for, for example, temporary storage of data and image data that are required by the CPU 121 to execute the control program.

The network interface 103 communicates with an external device via a network at the instruction of the system controller 101.

The printer engine 104 performs a printing process on a sheet of paper and the like based on print data processed by the output image processing unit 105. Especially when the MFP 100 operates as a printer, the printer engine 104 prints an image, and when the MFP 100 operates as a copier, the printer engine 104 prints an image read by the imaging unit 107.

For example, upon printing an image, the output image processing unit 105 executes a conversion process for converting a data format of the image into a data format for printing.

The storage device 106 is, for example, a HDD (Hard Disk Drive), and stores various types of data related to the operation of the MFP 100, and the like. The storage device 106 may further store image data of a screen displayed on the operation panel 300 of the MFP 100.

The imaging unit 107 reads an image of a document, and outputs it to the input image processing unit 108.

The input image processing unit 108 performs a conversion process of converting the format of the image data in cases such as of having read the image by the imaging unit 107.

In the MFP 100, the CPU 121 executes an appropriate program to achieve the operation of the MFP 100 such as described in the specification. The program executed by the CPU 121 may be stored in the ROM 122 as described above, stored in the storage device 106, or stored in a storage medium detachable from the MFP 100. The storage medium where the program is stored is a medium where data is stored in a non-volatile manner such as a CD-ROM (Compact Disc-Read Only Memory), DVD-ROM (Digital Versatile Disk-Read Only Memory), USB (Universal Serial Bus) memory, memory card, FD (Flexible Disk), hard disk, SSD (Solid State Drive), magnetic tape, cassette tape, MO (Magnetic Optical Disc), MD (Mini Disc), IC (Integrated Circuit) card (excluding a memory card), optical card, mask ROM, EPROM, or EEPROM (Electronically Erasable Programmable Read-Only Memory).

Among program modules provided as part of the operating system (OS) of a computer, the program according to the present disclosure may be one that calls a necessary module in a predetermined array at a predetermined timing and executes a process. In that case, the program itself does not include the above module, and executes a process in synchronization with the OS. The program according to the present disclosure can also include such a program that does not include a module.

Moreover, the program according to the present disclosure may be provided embedded in part of another program. Also in that case, the program itself does not include a module included in the above other program, and executes a process in synchronization with the other program. The program according to the present disclosure can also include such a program embedded in another program.

A program product provided is installed in a program storage unit such as a hard disk, and executed. The program product includes the program itself and a recording medium where the program is recorded.

(Configuration of the Operation Panel)

Figure 7:
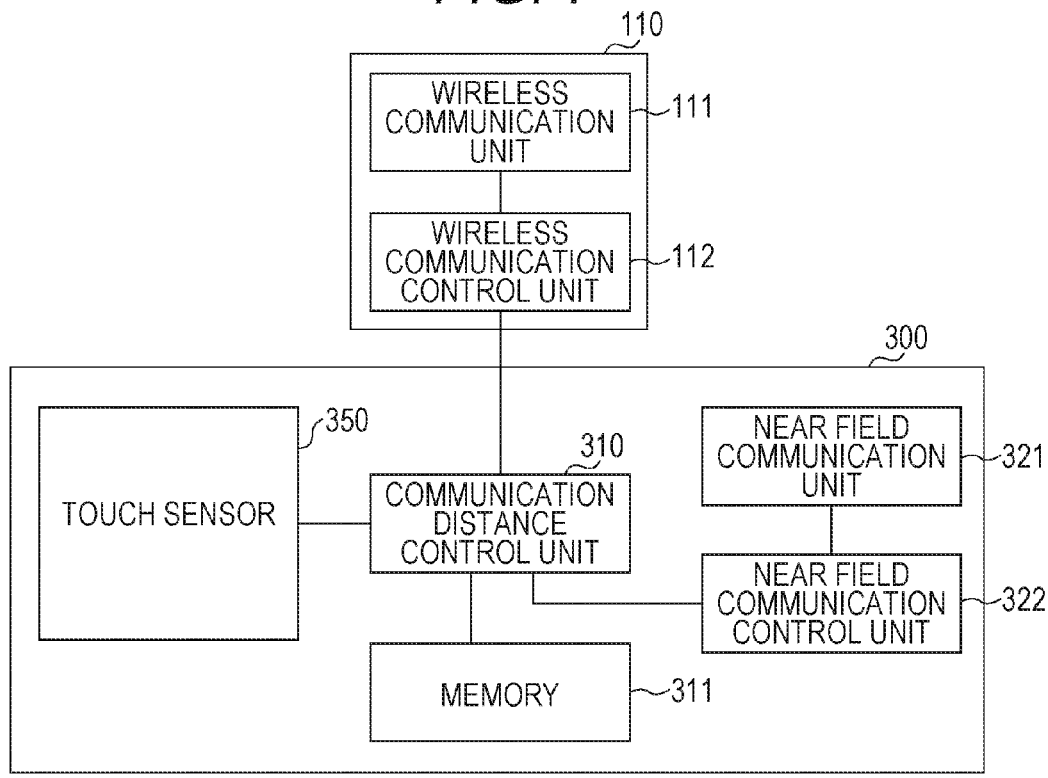
FIG. 7 is a diagram illustrating the block configuration of an operation panel including a portion used for control in the first embodiment.

FIG. 7 is a diagram illustrating the block configuration of the operation panel 300 including a portion used for control in the first embodiment. In the specification, in the MFP 100, the operation panel 300 is handled assuming to be attached to the main body of the MFP 100. The configuration of the operation panel 300 is described with reference to FIGS. 1 and 7.

The operation panel 300 includes the display 320 as illustrated in FIG. 1 and the like. The touch sensor 350 is provided on the display 320. As illustrated in FIG. 7, the operation panel 300 includes a communication distance control unit 310, a memory 311, a near field, communication unit 321, and a near field communication control unit 322 in addition to the touch sensor 350. In the MFP 100, the display 320 displays, for example, the software key placement. When a position corresponding to a software key displayed on the display 320 on the touch sensor 350 is touched, the MFP executes an operation in accordance with the key corresponding to the touched position. The touch area 360 is placed near the touch sensor 350 as illustrated in FIG. 1. Consequently, the user can cause the mobile terminal 400 to communicate with the MFP while looking at the operation panel 300.

The communication distance control unit 310 is realized by, for example, a control circuit including a CPU and the like. The CPU of the communication distance control unit 310 may be shared by the CPU 121 of the main body of the MFP 100, or may be provided separately from the CPU 121.

The memory 311 is a recording medium such as EEPROM. The memory 311 may be fixed to a main body of the operation panel 300, or may be detachable from the main body.

The near field communication unit 321 and the near field communication control unit 322 constitute the communication device for near field communication in the MFP 100. The near field communication unit 321 is realized by, for example, an antenna that catches radio waves of wireless communication. The near field communication control unit 322 is realized by, for example, a communication circuit that encodes the radio waves caught by the near field communication unit 321.

The communication distance control unit 310 is connected to the wireless communication unit 110 on the main body side of the MFP 100. The wireless communication unit 110 includes a wireless communication unit 111 and a wireless communication control unit 112. The wireless communication unit 111 is realized by, for example, an antenna unit for wireless communication. The wireless communication control unit 112 is realized by, for example, a communication circuit that encodes the radio waves received in wireless communication. The communication distance control unit 310 of the operation panel 300 is connected to the wireless communication control unit 112 and accordingly can acquire information received by the MFP 100 in wireless communication.

4. Hardware Configuration of the Mobile Terminal

Figure 8:
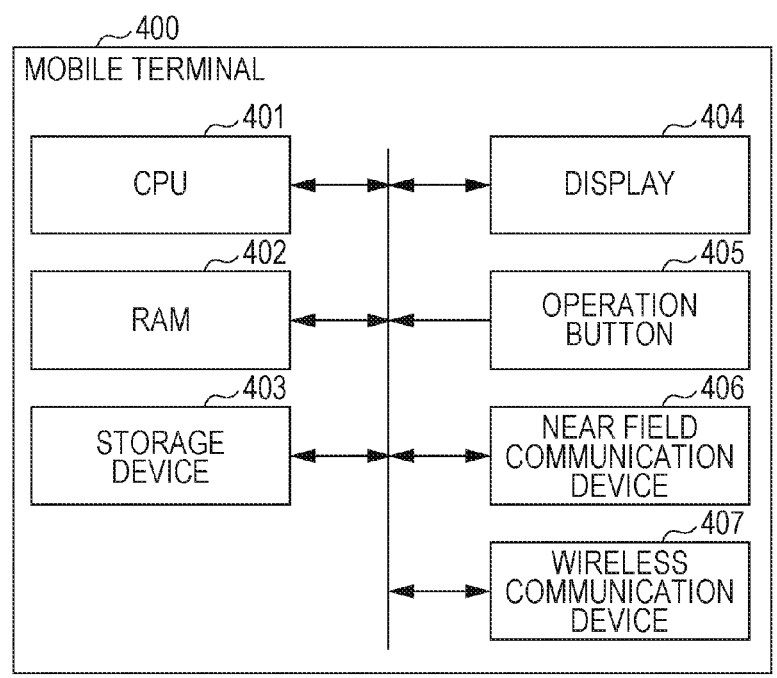
FIG. 8 is a diagram illustrating an example of the hardware configuration of a mobile terminal.

FIG. 8 is a diagram illustrating an example of the hardware configuration of the mobile terminal 400. FIG. 8 is referred to. The mobile terminal 400 includes a CPU 401, a RAM 402, a storage device 403, a display 404, an operation button 405, a near field communication device 406, and a wireless communication device 407, as main components. The CPU 401, the RAM 402, the storage device 403, the display 404, the operation button 405, the near field communication device 406, and the wireless communication device 407 are connected to each other by an internal bus.

The CPU 401 is an example of an arithmetic unit that executes a process for controlling the entire operation of the mobile terminal 400.

The RAM 402 functions as a work area at the time of the execution of a process in the CPU 401.

The storage device 403 saves data of various programs such as an OS (Operating System) program and an application program that are executed by the CPU 401, and data used to execute these programs. Examples of the storage device 403 include a medium to store data in a non-volatile manner such as EEPROM. Moreover, a program downloaded via a network may be installed in the storage device 403.

The display 404 is a display device for displaying an image illustrating a process result of a program executed by the CPU 401.

The operation button 405 is an example of an input device for inputting information into the mobile terminal 400, such as the input of an instruction related to a process of an application during execution. Another example of the input device included in the mobile terminal 400 is a touch sensor provided on the display 404.

The near field communication device 406 is an example of a communication device for communicating information with an external device such as the MFP 100 in compliance with, for example, the NFC standard. The near field communication device 406 includes, for example, an antenna unit and an encoding circuit as in the configuration illustrated by the near field communication unit 321 and the near field communication control unit 322 in FIG. 5.

The wireless communication device 407 includes, for example, an antenna unit and an encoding circuit as in the configuration illustrated by the wireless communication unit 111 and the wireless communication control unit 112 in FIG. 7.

5. Condition for the Placement of the Wireless Communication Unit

In the MFP 100 of the first embodiment, the wireless communication unit 110 is placed such that the outer edge of the area where the wireless communication unit 110 establishes wireless communication has an intersection with the communication area of the near field communication unit 321 on the touch area 360 even if any of a plurality of possible positions that the operation panel 300 takes is taken. A description is given hereinafter of a specific example of a condition for the placement of the wireless communication unit 110.

Figure 9:
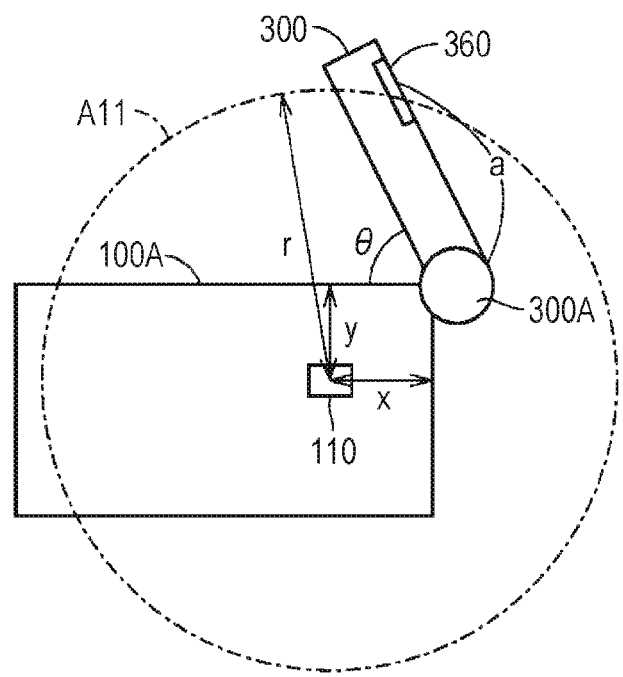
FIG. 9 is a diagram illustrating variables used for discussing a condition for the placement of a wireless communication unit.

FIG. 9 is a diagram illustrating variables used for discussing the condition for the placement of the wireless communication unit 110. FIG. 9 schematically illustrates a vertical cross-section of the MFP 100 as viewed from the left in FIG. 9, the coordinates of the wireless communication unit 110 in the MFP 100 are indicated by a value x and a value y. The value x is a coordinate in the depth direction (the left-and-right direction in FIG. 9) in the main body 100A of the MFP 100. The value y is a coordinate in the height direction (the up-and-down direction in FIG. 9) in the main body 100A.

Moreover, in FIG. 9, a value a is presented as the position of the touch area 360. The value a indicates the distance between a lower end of the operation panel 300 and the center of the touch area 360 in the longitudinal direction of the operation panel 300. Moreover, the angle formed by the principal surface of the operation panel 300 and the main body 100A is presented as an angle θ.

The positional relationship with the touch area 360 is considered for the placement of the wireless communication unit 110. In FIG. 9, in terms of a surface along the depth direction of the main body 100A (a surface along the surface of paper of FIG. 9), the wireless communication unit 110 is assumed to be provided at a position overlapping with the touch area 360.

Moreover, in FIG. 9, the area where the wireless communication unit 110 establishes wireless communication is indicated by the broken line A11. The broken line A11 is a circle with the wireless communication unit 110 at the center. In FIG. 9, the radius of the circle is indicated by a radius r.

In the MFP 100 of the first embodiment, the values x and y determining the placement of the wireless communication unit 110 are determined in such a manner as to satisfy the condition for the placement of the wireless communication unit 110. The condition for the placement is that the outer edge of the area where the wireless communication unit 110 establishes wireless communication has an intersection in the touch area 360 with the outer edge of the area where the near field communication unit 321 provided in the operation panel 300 establishes near field communication.

Figure 10:
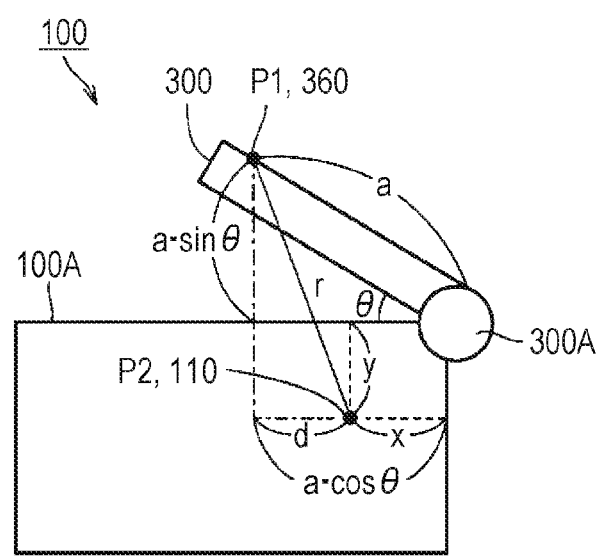
FIG. 10 is a diagram illustrating a state where the wireless communication unit is located frontward of a center point of a touch area.
Figures 11, 12:
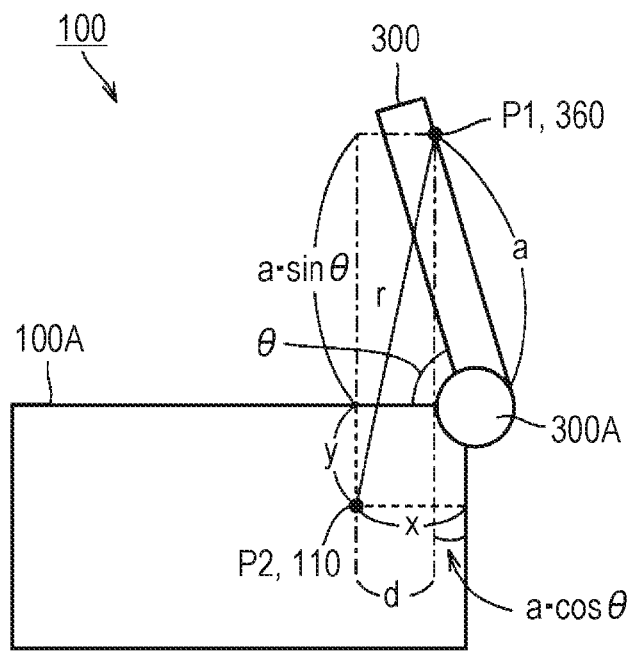
FIG. 11 is a diagram illustrating a state where the wireless communication unit is located backward of the center point of the touch area.
FIG. 12 is a diagram illustrating conditions respectively for the two states illustrated in FIGS. 10 and 11.

In the first embodiment, the position of the wireless communication unit 110 is set considering two cases. FIGS. 10 and 11 are diagrams illustrating the two cases of the position of the wireless communication unit 110. In FIGS. 10 and 11, a center point of the touch area 360 is indicated by a point P1. Moreover, the position of the wireless communication unit 110 is indicated by a point P2. Moreover, in FIGS. 10 and 11, the distance between the points P1 and P2 in the depth direction (the left-and-right direction in FIG. 9) in the main body 100A is indicated by a distance d. FIG. 12 is a diagram illustrating conditions respectively for these two cases.

FIG. 10 illustrates a case where the wireless communication unit 110 (the point P2) is located frontward of the center point (the point P1) of the touch area 360. As illustrated below as equation (A1), such a case is identified as a case where the value x is larger than the product of the value a and the cosine of the angle θ.

$$a \cdot \cos \theta > x \quad (A1)$$

In the case illustrated in FIG. 10, the radius r is determined from the Pythagorean theorem in accordance with equation (1) of FIG. 12. Moreover, as illustrated by equation (2) of FIG. 12, the distance d is obtained by subtracting the value a from the cosine of the angle θ.

FIG. 11 illustrates a case where the wireless communication unit 110 (the point P2) is located at the same position as or backward of the center point (the point P1) of the touch area 360 in the depth direction of the main body 100A. As illustrated below as equation (A2), such a case is identified as a case where the value x is equal to or lower than the product of the value a and the cosine of the angle θ.

$$a \cdot \cos \theta \leq x \quad (A2)$$

In the case illustrated in FIG. 11, the radius r is determined from the Pythagorean theorem in accordance with equation (1) of FIG. 12 as in the case illustrated in FIG. 10. As illustrated by equation (3) of FIG. 12, the distance d is obtained by subtracting the cosine of the angle θ from the value a.

In other words, in the case of the determination with equation (A1), the values x and y are determined based on equations (1) and (2) of FIG. 12. Moreover, in the case of the determination with equation (A2), the values x and y are determined based on equations (1) and (3) of FIG. 12.

In the first embodiment, the angle θ of the operation panel 300 can take a plurality of values. The value a is constant irrespective of the angle θ. In any of the case of the determination with equation (A1), and the case of the determination with equation (A2), the variables are the values x and y and the distance d.

In the first embodiment, a combination of the radius r and the values x and y is set for each possible angle θ adopted by the operation panel 300 in such a manner as to satisfy two equations (1) and (2) or two equations (1) and (3). For example, after one of the three values (radius r, value x, value y) is fixed in the combination, the pair of equations (1) and (2) or equations (1) and (3) is used to determine the other two values. Which of the pairs of equations (1) and (2) or equations (1) and (3) the angle θ is substituted into is specified by which of the case of equation (A1) and the case of equation (A2) the angle θ is applicable to.

Upon determining the position of the wireless communication unit 110, not the center (the point P1) of the touch area 360 but the upper and lower ends of the touch area 360 may be considered. FIG. 13 is a diagram illustrating the distances between the lower end of the operation panel 300 and the upper and lower ends of the touch area 360. In FIG. 13, the distance between the lower end of the operation panel 300 and the lower end of the touch area 360 is indicated by a value a1. The distance to the upper end of the touch area 360 is indicated by a value a2. Moreover, FIG. 14 is a diagram illustrating conditions including the distances between the lower end of the operation panel 300 and the upper and lower ends of the touch area 360.

Upon determining the values x and y based on the conditions illustrated in FIG. 12, instead of the value a, the values a1 and a2 may be used. In other words, the values x and y are obtained on the condition that equations and (2) or equations (1) and (3) are satisfied when the values a1 and a2 are used instead of the value a.

The cases illustrated in equations (A1) and (A2) described with reference to FIGS. 10 and 11 can be changed with the values a1 and a2, for example, as illustrated respectively in equations (B1) and (B2) in FIG. 14.

In the MFP 100 of the first embodiment described above, if the near field communication unit 321 can be located at a plurality of points with a change in position of the operation panel 300, the placement of the wireless communication unit 110 is set in such a manner as to satisfy a specific condition at all the positions of the near field communication unit 321. The specific condition is that the outer edge of the area where wireless communication is established has an intersection in the touch area 360 with the outer edge of the area where near field communication is established.

The specific condition may be that the area where wireless communication is established (an area specified by a communication establishment distance within which a first communication unit establishes communication with a terminal) includes the touch area 360 (a specific area).

Figure 19A:
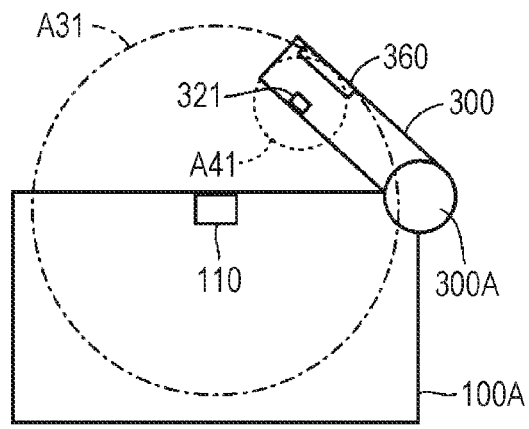
FIGS. 19A to 19C are diagrams illustrating comparative examples in the present disclosure.
Figure 19B:
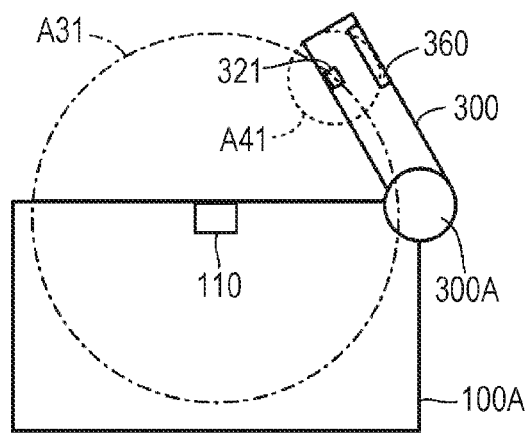
Figure 19C:
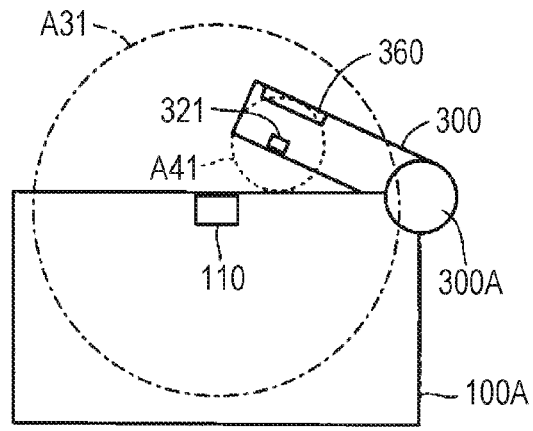

FIGS. 19A to 19C are diagrams illustrating comparative examples in the present disclosure. FIGS. 19A to 19C illustrate, states (A), (B), and (C). In FIGS. 19A to 19C, the area where the wireless communication unit 110 establishes wireless communication is indicated as a broken line A31. The broken line A31 is, for example, a circle with the wireless communication unit 110 at the center. Moreover, a broken line A41 indicates the area where the near field communication unit 321 establishes near field communication. The broken line A41 is, for example, a circle with the near field communication unit 321 at the center. In the comparative examples illustrated in FIGS. 19A to 19C, in the state (A), the broken lines A31 and A41 have an intersection in the touch area 360.

However, in the states (B) and (C) illustrated in FIGS. 19A to 19C, the broken lines A31 and A41 do not have an intersection in the touch area 360. From this point, in the states (B) and (C) illustrated in FIGS. 19A to 19C, a user who attempts to establish wireless communication between the mobile terminal 400 and the MFP 100 and a user who attempts to establish near field communication between the mobile terminal 400 and the MFP 100 need to hold their mobile terminals 400 over different positions, respectively.

On the other hand, in the first embodiment, as illustrated as the states (A) to (C) in FIGS. 4A to 4C, the user who attempts to establish wireless communication between the mobile terminal 400 and the MFP 100 and the user who attempts to establish near field communication between the mobile terminal 400 and the MFP 100 hold their mobile terminals 400 over the same position (the touch area 360). Consequently, it is possible to avoid a situation where users are confused by the difference in position to hold the mobile terminal 400 depending on the communication technology.

Second Embodiment

1. Outline

In the MFP 100 of a second embodiment, the near field communication unit 321 moves with the movement of the operation panel 300 as in the MFP 100 of the first embodiment. In the second embodiment, the point were the near field communication unit 321 is located is not limited to a plurality of points. In other words, the operation panel 300 can rotate about the hinge 300A, and stop at any rotation angle. In the MFP 100 of the second embodiment, the position of the near field communication unit 321 is determined based on the rotation angle at which the operation panel 300 is at rest. The position of the wireless communication unit 110 is changed in accordance with the determined position.

FIG. 15 is a diagram schematically illustrating the configuration of a moving unit for moving the wireless communication unit 110 in the MFP 100 of the second embodiment. FIG. 15 is referred to. A moving unit 190 includes a rack rail 171, a pinion 172, and a motor control IC (Integrated Circuit) 161. The rack rail 171 and the pinion 172 are placed in such a manner as to be engaged with each other. The wireless communication unit 110 is attached to the rack rail 171.

The pinion 172 is driven by the motor control IC 161 to be rotated. The rack rail 171 moves in the up-and-down direction with the rotation of the pinion 172 while being engaged with the pinion 172. More specifically, the rack rail 171 moves down with the clockwise rotation of the pinion 172 in FIG. 15, and moves up with the counterclockwise rotation of the pinion 172. The operation of the motor control IC 161 is controlled by the CPU 121.

2. Hardware Configuration of the MFP

Figure 16:
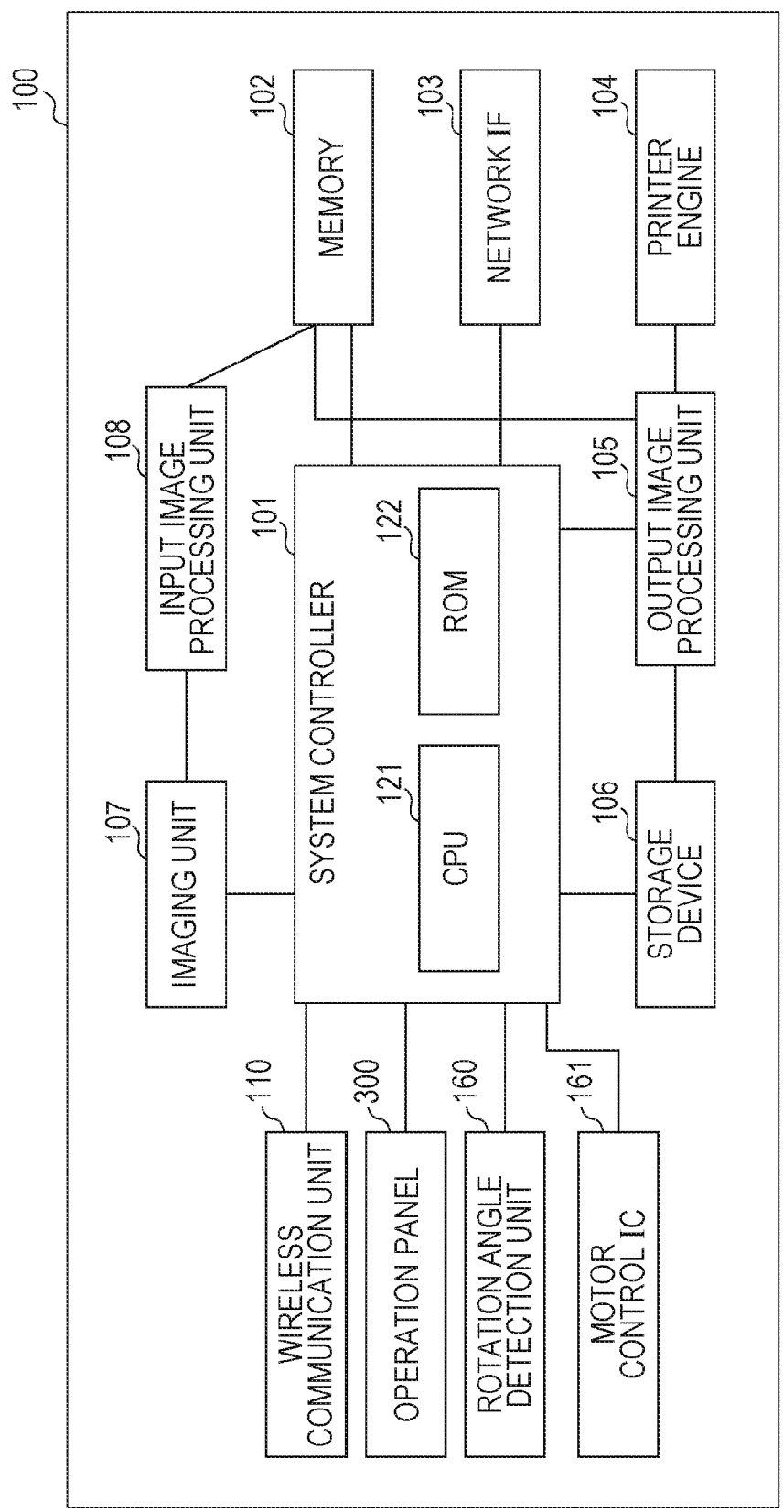
FIG. 16 is a diagram illustrating the hardware configuration of the MFP of the second embodiment.

FIG. 16 is a diagram illustrating the hardware configuration of the MFP 100 of the second embodiment. As illustrated in FIG. 16, the MFP 100 of the second embodiment further includes a rotation angle detection unit 160 and the motor control IC 161 in addition to the configuration of the MFP 100 of the first embodiment illustrated in FIG. 6. The rotation angle detection unit 160 is realized by, for example, a sensor that detects the rotation angle of the operation panel 300. An example of the sensor is a sensor that optically detects the rotation angle. Another example is a sensor where electrical resistance is changed by the rotation angle.

3. Flow of a Process

Figure 17:
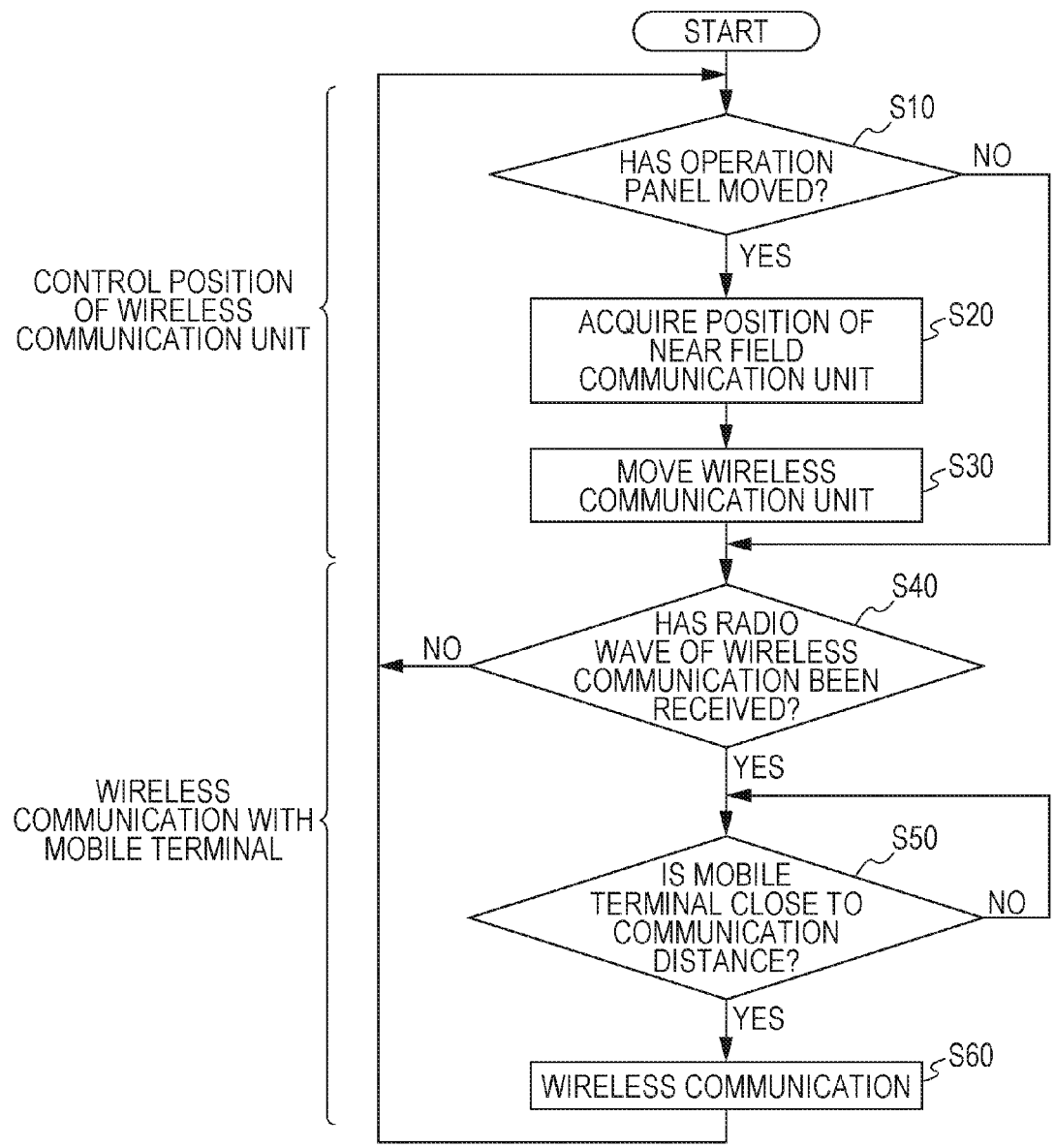
FIG. 17 is a flowchart of a process executed to move the wireless communication unit in accordance with the movement of a near field communication unit in the MFP of the second embodiment.

FIG. 17 is a flowchart of a process executed to move the wireless communication unit 110 in accordance with the movement of the near field communication unit 321 in the MFP 100 of the second embodiment.

FIG. 17 is referred to. In Step S10, the CPU 121 determines whether or not the operation panel 300 has moved, based on the detection output of the rotation angle detection unit 160. If having not determined that the operation panel 300 had moved (NO in Step S10), the CPU 121 advances the control to Step S40. On the other hand, if having determined that the operation panel 300 had moved (YES in Step S10), the CPU 121 advances the control to Step S20.

In Step S20, the CPU 121 acquires the position of the near field communication unit 321 in the operation panel 300 moved. For example, information to determine the position of the near field communication unit 321 in accordance with the inclination angle of the operation panel 300 (for example, a table for converting the inclination angle of the operation panel 300 into the position of the near field communication unit 321) is stored in the storage device 106. The CPU 121 obtains the current inclination angle of the operation panel 300 based on, for example, the rotation angle of the operation panel 300 detected by the rotation angle detection unit 160, and an initial value of the inclination angle of the operation panel 300. The CPU 121 then obtains the position of the near field communication unit 321 corresponding to the current inclination angle. The control is advanced to Step S30.

In Step S30, the CPU 121 operates the motor control IC 161 to move the wireless communication unit 110 to a position corresponding to the position of the near field communication unit 321 acquired in Step S20. Consequently, the pinion 172 is driven. The wireless communication unit 110, together with the rack rail 171, moves to the position corresponding to the position of the near field communication unit 321 acquired in Step S20 in synchronization with the drive of the pinion 172. The control is then advanced to Step S40.

In Step S40, the CPU 121 determines whether or not the wireless communication unit 110 has received a radio wave of wireless communication from the mobile terminal 400. If having determined that the wireless communication unit 110 had received a radio wave of wireless communication (YES in Step S40), the CPU 121 advances the control to Step S50. On the other hand, if having not determined that the wireless communication unit 110 had received a radio wave of wireless communication (NO in Step S40), the CPU 121 returns the control to Step S10.

In Step S50, the CPU 121 determines whether or not the mobile terminal 400 is close to an area where the mobile terminal 400 establishes wireless communication with the wireless communication unit 110 (for example, the are specified by the broken line A11 of FIG. 3). If, for example, the strength of the radio wave received from the mobile terminal 400 is equal to or more than a strength corresponding to the area, the CPU 121 determines that the mobile terminal 400 is close to the area where the mobile terminal 400 establishes wireless communication. In the MFP 100, an example of the strength of a radio wave received from the terminal located on the broken line A11 of FIG. 3 is stored as field strength for the establishment of communication in the memory 102.

If having not determined that the mobile terminal 400 is close to the area (NO in Step S50), the CPU 121 maintains the control at Step S50. On the other hand, if having determined that the mobile terminal 400 is close to the area (YES in Step S50), the CPU 121 advances the control to Step S60.

In Step S60, the CPU 121 establishes wireless communication with the mobile terminal 400 and returns the control to Step S10.

In the second embodiment described above, the MFP 100 detects the rotation angle of the operation panel 300, determines the position of the near field communication unit 321 based on the rotation angle, and moves the wireless communication unit 110 to a position that satisfies a specific condition for the determined position. The specific condition is that the outer edge of the area were wireless communication is established has an intersection in the touch area 360 with the outer edge of the area where near field communication is established.

The specific condition may be that the area where wireless communication is established (the area specified by the communication establishment distance within which the first communication unit establishes communication with the terminal) includes the touch area 360 (the specific area).

Consequently, the user can establish both near field communication and wireless communication between the MFP 100 and the mobile terminal 400 by holding the mobile terminal 400 over the same place (the touch area 360) while setting the inclination angle of the operation panel 300 at a desired angle.

The rotation angle (the position moved) of the operation panel 300 may be input into the operation panel 300 by the user instead of being detected by the rotation angle detection unit 160. Consequently, the CPU 121 can acquire the position of the moved operation panel 300 while omitting the rotation angle detection unit 160 in the MFP 100.

4. First Modification of the Configuration for Satisfying the Specific Condition In the MFP 100, for example, a threshold value of the field strength for allowing the wireless communication unit 110 to establish wireless communication is changed to permit a change in the area where wireless communication is established (for example, the broken line A11 of FIG. 2). From this point, in the MFP 100, both the placement of the wireless communication unit 110 and the area where wireless communication is established may be adjusted to satisfy the above specific condition (that the outer edge of the area where wireless communication is established has an intersection in the touch area 360 with the outer edge of the area where near field communication is established).

More specifically, the CPU 121 may change the area where wireless communication is established in accordance with the rotation angle of the operation panel 300 within part of the angular range (for example, equal to or more than 80° with respect to the horizontal direction) of the rotation angle of the operation panel 300, and move the wireless communication unit 110 in accordance with the rotation angle of the operation panel 300 within the rest of the angular range (for example, less than 80° with respect to the horizontal direction)

5. Second Modification of the Configuration for Satisfying the Specific Condition In the MFP 100, the area where the wireless communication unit 110 establishes wireless communication (for example, the broken line A11 of FIG. 2) is changed by changing the threshold value of the field strength for establishing the wireless communication, or changing the placement of the wireless communication unit 110. From this point, the change of the threshold value may be combined with the change of the placement to satisfy the specific condition (that the outer edge of the area where wireless communication is established has an intersection in the touch area 360 with the outer edge where near field communication is established).

Third Embodiment

1. Outline

The hardware configuration of the MFP 100 of a third embodiment can be made similar to that of the first embodiment. The MFP 100 of the third embodiment includes a member that moves in synchronization with the movement of the operation panel 300, and a mechanism that moves the wireless communication unit 110 in synchronization with the member.

2. Configuration of the Moving Unit

Figure 18:
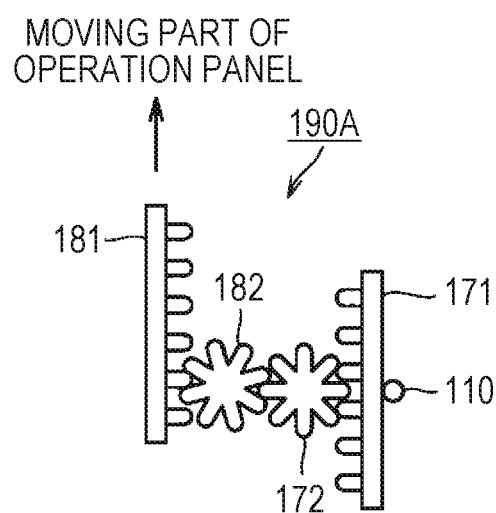
FIG. 18 is a diagram schematically illustrating a member that moves in synchronization with the movement of an operation panel, and a mechanism that moves a wireless communication unit in synchronization with the member.

FIG. 18 is a diagram schematically illustrating the configuration of the member and mechanism. In FIG. 18, the member and mechanism are illustrated as a moving unit 190A. The configuration of the moving unit 190A is described below with reference to FIG. 18.

The moving unit 190A includes a rack rail 181 and a pinion 182 in addition to the rack rail 171 and the pinion 172. The rack rail 181 is physically coupled to, for example, the operation panel 300 to be displaced in accordance with the movement (for example, the rotational movement about the hinge 300A) of the operation panel 300. The pinion 182 is engaged with the rack rail 181 to rotate with the displacement of the rack rail 181. The pinion 182 is further engaged with the pinion 172. The pinion 172 rotates, with the rotation of the pinion 182, in an opposite direction to the rotation direction of the pinion 182. The rack rail 171 moves in the up-and-down direction with the rotation of the pinion 172. The wireless communication unit 110 is physically coupled to the rack rail 171.

In the third embodiment, the operation panel 300 is physically coupled to the wireless communication unit 110 via the rack rail 181, the pinion 182, the pinion 172, and the rack rail 171. Consequently, when the position of the near field communication unit 321 is changed by the rotation of the operation panel 300, the wireless communication unit 110 moves to a position corresponding to the changed position of the near field communication unit 321 in synchronization with the change of the position.

The shapes and sizes of the rack rail 181, the pinion 182, the pinion 172, and the rack rails 171 are set such that even if the near field communication unit 321 moves, the positional relationship between the near field communication unit 321 and the wireless communication unit 110, which satisfies a specific condition, is maintained. The specific condition is that the outer edge of the area where wireless communication is established has an intersection in the touch area 360 with the outer edge of the area where near field communication is established. The specific condition may be that the area where wireless communication is established (the area specified by the communication establishment distance within which the first communication unit establishes communication with the terminal) includes the touch area 360 (the specific area).

Although the present invention has been described and illustrated in detail, it is clearly understood that the same is by way of illustrated and example only and is not to be taken by way of limitation, the scope of the present invention being interpreted by terms of the appended claims. The scope of the present invention is intended to include meanings equivalent to the claims and all changes within the scope. Moreover, the invention described in the embodiments and modifications is intended to be carried out singly or in combination where possible.

What is claimed is:

1. An image processing apparatus capable of communicating with a terminal, comprising:
    a wireless communicator configured to communicate wirelessly with the terminal, the wireless communicator establishing communication with the terminal at a wireless communication establishment distance; and
    a near field communicator configured to perform near field communication with the terminal over a shorter communication distance than that of the wireless communicator, wherein
    the near field communicator is configured to be movable together with an operation panel of the image processing apparatus and establish communication with the terminal in a specific area on the operation panel,
    the operation panel is displaceable relative to a main body of the image processing apparatus,
    at least a part of the operation panel can be located beyond the wireless communication establishment distance when the operation panel is displaced, and
    the specific area is provided within a distance where both the wireless communicator and the near field communicator can establish communication with the terminal regardless of the displacement of the operation panel.

2. The image processing apparatus according to claim 1, wherein
    the operation panel is rotatable on the image processing apparatus, and
    a pivot on which the operation panel rotates is provided such that the specific area includes the communication establishment distance irrespective of the rotation operation of the operation panel.

3. The image processing apparatus according to claim 1, wherein
    the wireless communicator is configured to detect field strength of a radio wave received from the terminal, and
    field strength for establishment of communication with the terminal is set for the wireless communicator.

4. The image processing apparatus according to claim 3, wherein the wireless communicator does not establish communication with the terminal upon the field strength of the radio wave received from the terminal being lower than the field strength for establishment of communication, and establishes communication with the terminal upon the field strength of the radio wave received from the terminal being equal to or more than the predetermined field strength.

5. The image processing apparatus according to claim 1, further comprising:
    an adjustment device configured to adjust an area where the wireless communicator establishes communication such that the wireless communicator is placed inside a housing of the image processing apparatus.

6. The image processing apparatus according to claim 1, wherein the wireless communicator is placed at a position different from the near field communicator on the image processing apparatus.

7. The image processing apparatus according to claim 1, wherein the specific area is a touch area for holding the terminal on the image processing apparatus.

8. The image processing apparatus according to claim 1, wherein the near field communicator is placed in the operation panel.

9. An image processing apparatus capable of communicating with a terminal, comprising:
- a wireless communicator configured to communicate wirelessly with the terminal;
- a near field communicator configured to perform near field communication with the terminal over a shorter communication distance than that of the wireless communicator, be movable together with an operation panel of the image processing apparatus, and establish communication with the terminal in a specific area on the operation panel;
- a moving device configured to move the wireless communicator in accordance with the movement of the operation panel such that the specific area includes a communication establishment distance within which the wireless communicator establishes communication with the terminal; and
- the operation panel being displaceable relative to a main body of the image processing apparatus,
- wherein at least a part of the operation panel can be located beyond the communication establishment distance when the operation panel is displaced.

10. The image processing apparatus according to claim 9, further comprising
- an input device configured to accept input of information determining the position of the near field communicator moved, wherein
- the moving device moves the wireless communicator based on the information input to the input device.

11. A method for controlling an image processing apparatus including a wireless communicator configured to communicate wirelessly with a terminal, and a near field communicator configured to perform near field communication with the terminal over a shorter communication distance than that of wireless communicator, wherein
- the near field communicator is configured to be movable together with an operation panel of the image processing apparatus and establish communication with the terminal in a specific area on the operation panel, the method comprising:
- moving the wireless communicator in accordance with the movement of the operation panel such that the specific area includes a communication establishment distance within which the wireless communicator establishes communication with the terminal, wherein
- the operation panel is displaceable relative to a main body of the image processing apparatus, and
- at least a part of the operation panel is moved beyond the communication establishment distance when the operation panel is displaced.

12. A non-transitory recording medium storing a computer readable program to be executed in an image processing apparatus including a wireless communicator configured to communicate wirelessly with a terminal, and a near field communicator configured to perform near field communication with the terminal over a shorter communication distance than that of the wireless communicator, wherein
- the near field communicator is configured to be movable together with an operation panel of the image processing apparatus and establish communication with the terminal in a specific area on the operation panel, the program causing the image processing apparatus to execute:
- moving wireless communicator in accordance with the movement of the operation panel such that the specific area includes a communication establishment distance within which the wireless communicator establishes communication with the terminal, wherein
- the operation panel is displaceable relative to a main body of the image processing apparatus, and
- at least a part of the operation panel is moved beyond the communication establishment distance when the operation panel is displaced.

13. An image processing apparatus capable of communicating with a terminal, comprising:
- a wireless communicator configured to communicate wirelessly with the terminal, the wireless communicator establishing communication with the terminal at a wireless communication establishment distance; and
- a second communicator configured to detect the terminal within a detection distance different from the wireless communication establishment distance, wherein
- the second communicator is configured to be movable together with an operation panel of the image processing apparatus and establish detection of the terminal in a specific area on the operation panel, wherein
- the operation panel is displaceable relative to a main body of the image processing apparatus,
- at least a part of the operation panel can be located beyond the wireless communication establishment distance when the operation panel is displaced, and
- the specific area is provided within a distance where the wireless communicator can establish communication with the terminal regardless of the displacement of the operation panel, the second communicator being able to detect the terminal within the distance.

14. An image processing apparatus capable of communicating with a terminal, comprising:
- a wireless communicator configured to communicate wirelessly with the terminal, the wireless communicator establishing communication with the terminal at a wireless communication establishment distance;
- a second communicator configured to detect the terminal within a detection distance different from the wireless communication establishment distance, be movable together with an operation panel of the image processing apparatus, and establish detection of the terminal in a specific area on the operation panel;
- a moving device configured to move the wireless communicator in accordance with the movement of the operation panel such that the specific area includes the wireless communication establishment distance within which the wireless communicator establishes communication with the terminal; and
- the operation panel being displaceable relative to a main body of the image processing apparatus,
- wherein at least a part of the operation panel can be located beyond the wireless communication establishment distance when the operation panel is displaced.

* * * * *